May 2, 1950  G. H. NORQUIST  2,505,788
AUTOMATIC LINE FORMING MACHINE
Filed Oct. 3, 1944  8 Sheets-Sheet 1
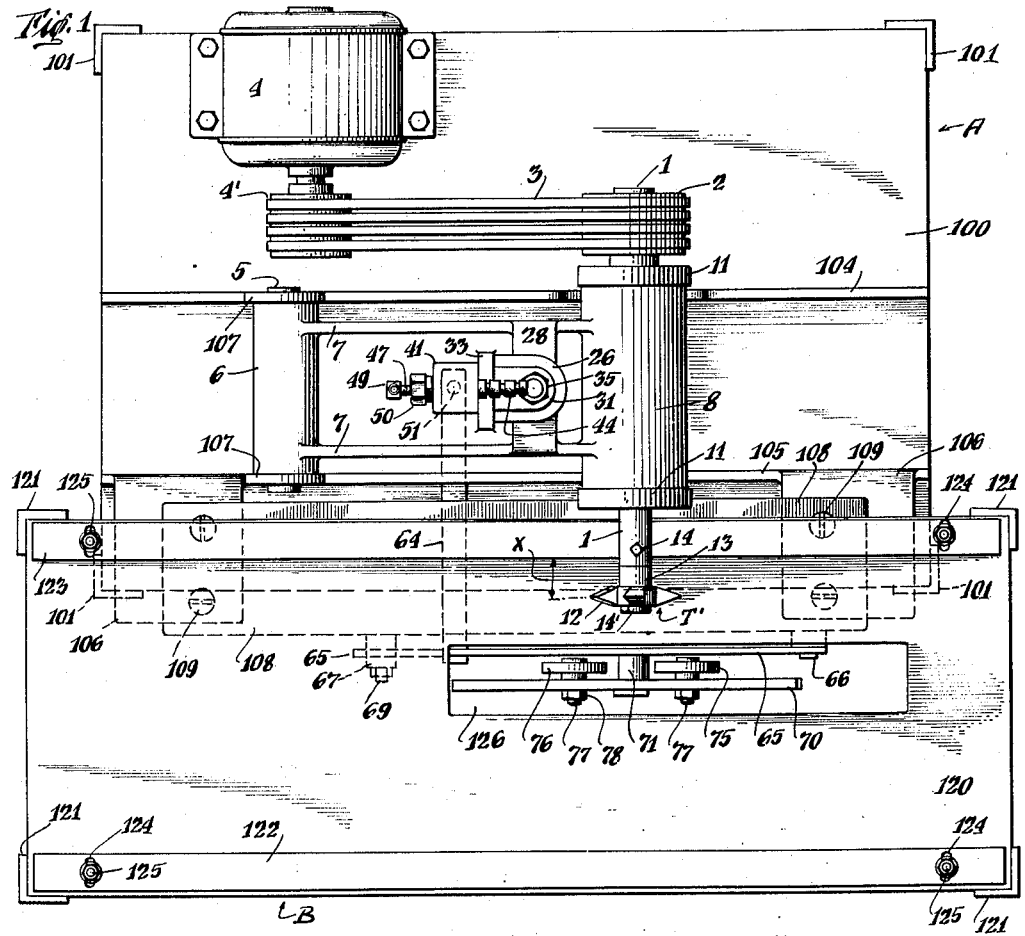
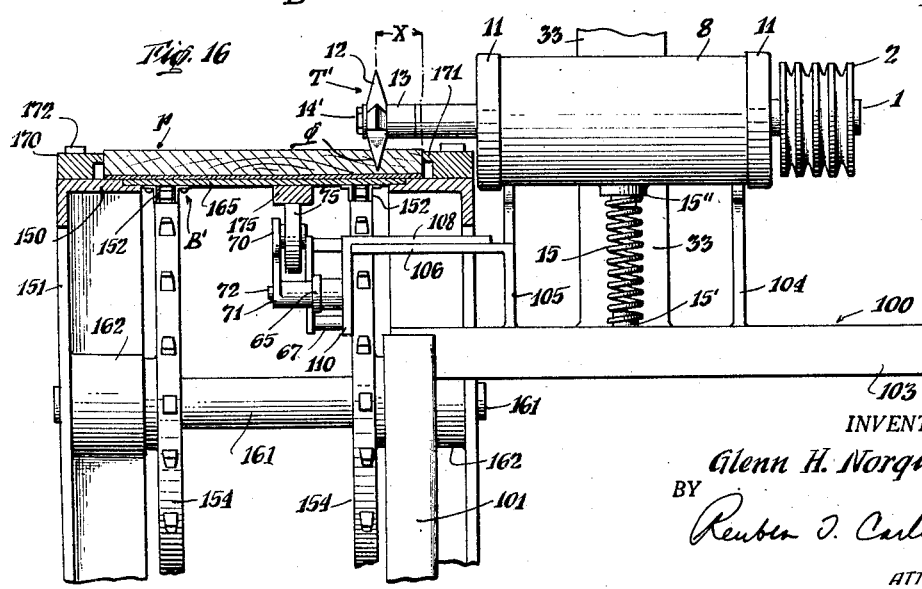
INVENTOR.
Glenn H. Norquist
BY
Reuben O. Carlson
ATTORNEY May 2, 1950 G. H. NORQUIST 2,505,788
AUTOMATIC LINE FORMING MACHINE
Filed Oct. 3, 1944 8 Sheets-Sheet 2
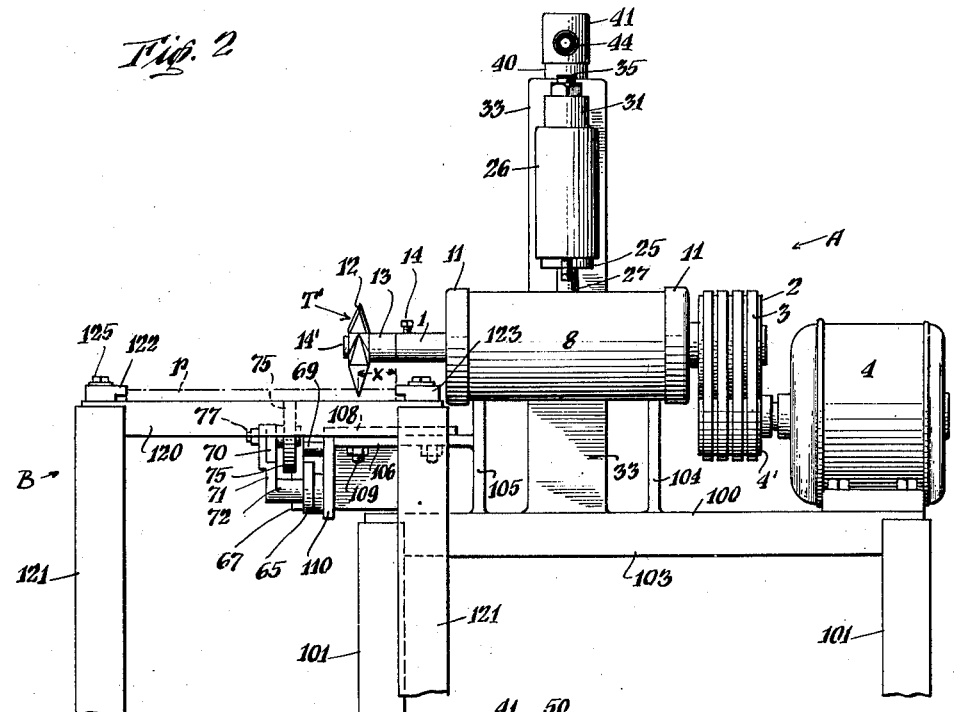
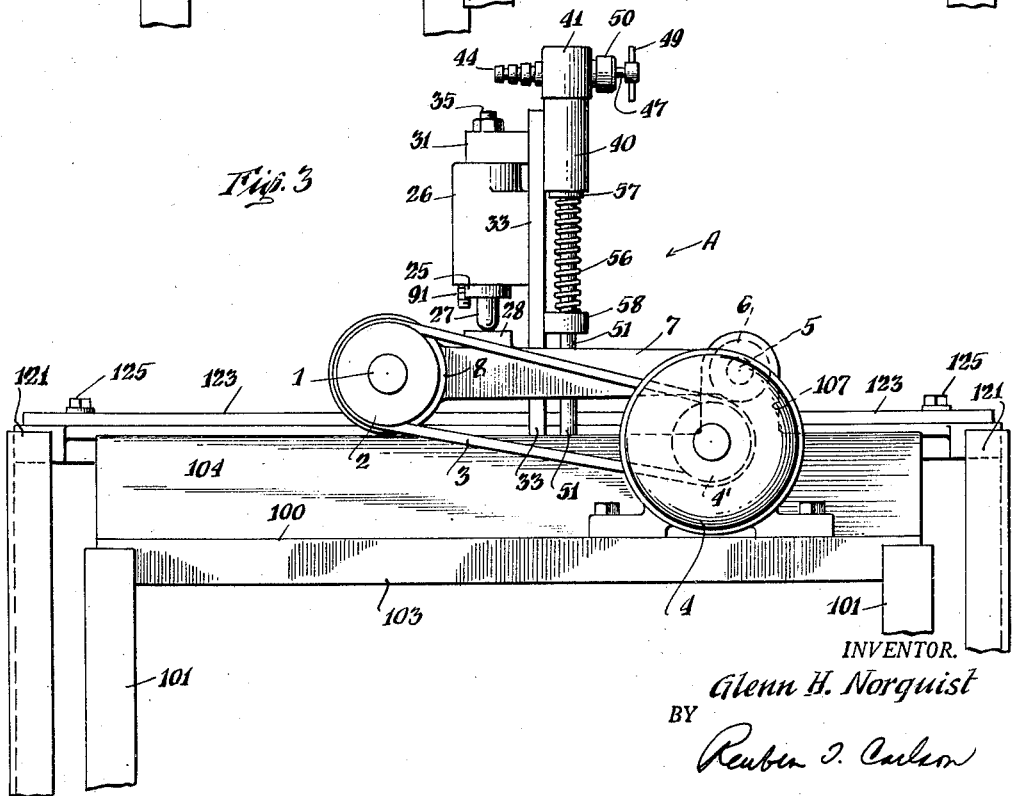
INVENTOR.
Glenn H. Norquist
BY
Reuben J. Carlson
ATTORNEY May 2, 1950      G. H. NORQUIST      2,505,788
AUTOMATIC LINE FORMING MACHINE
Filed Oct. 3, 1944      8 Sheets-Sheet 3
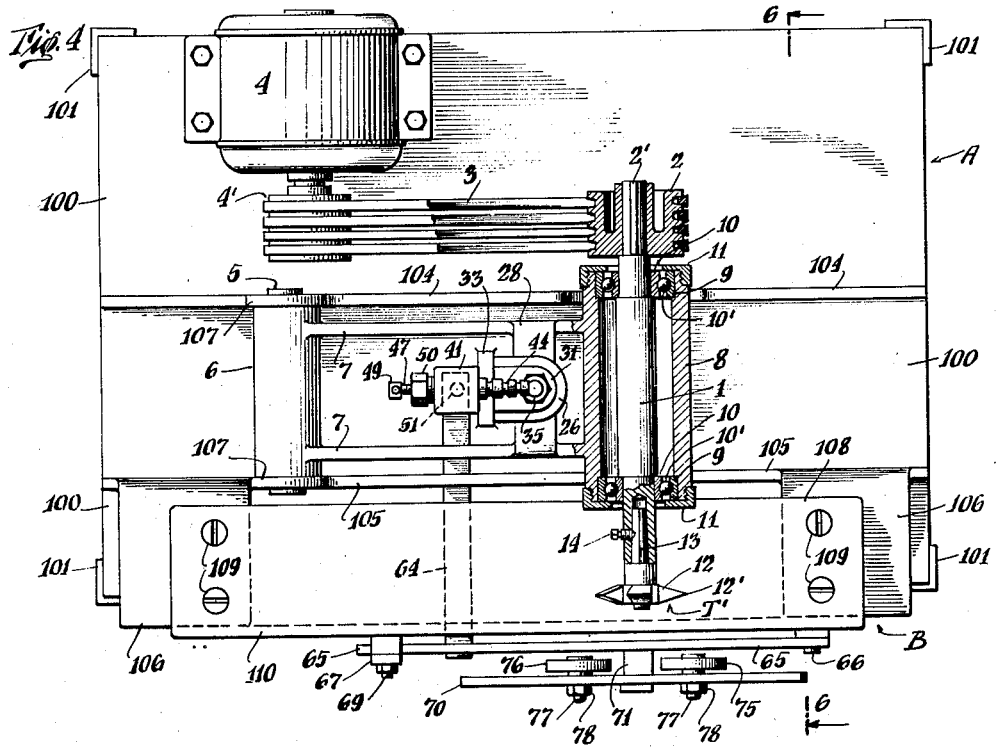
INVENTOR.
Glenn H. Norquist
BY
Reuben T. Carlson
ATTORNEY

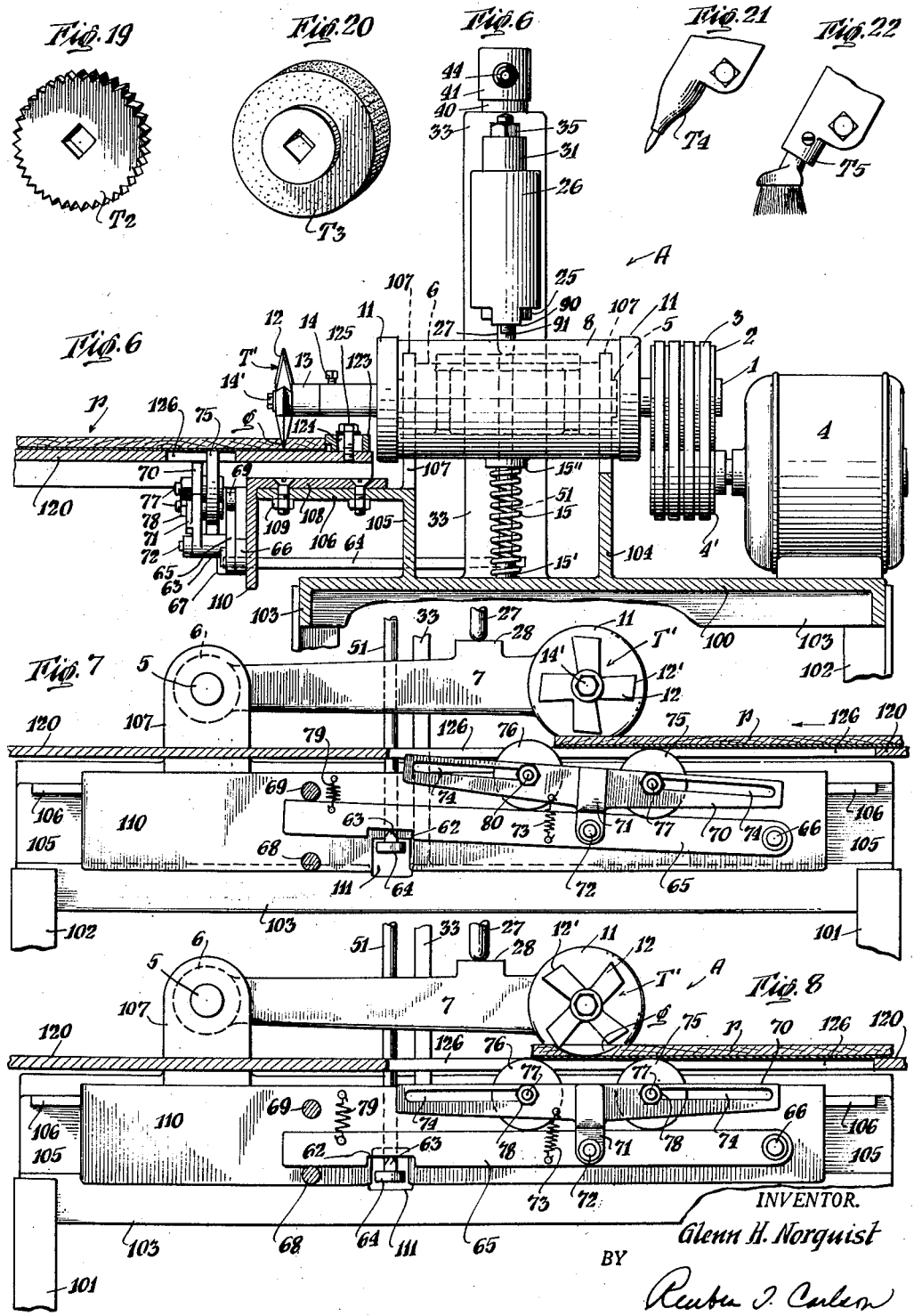

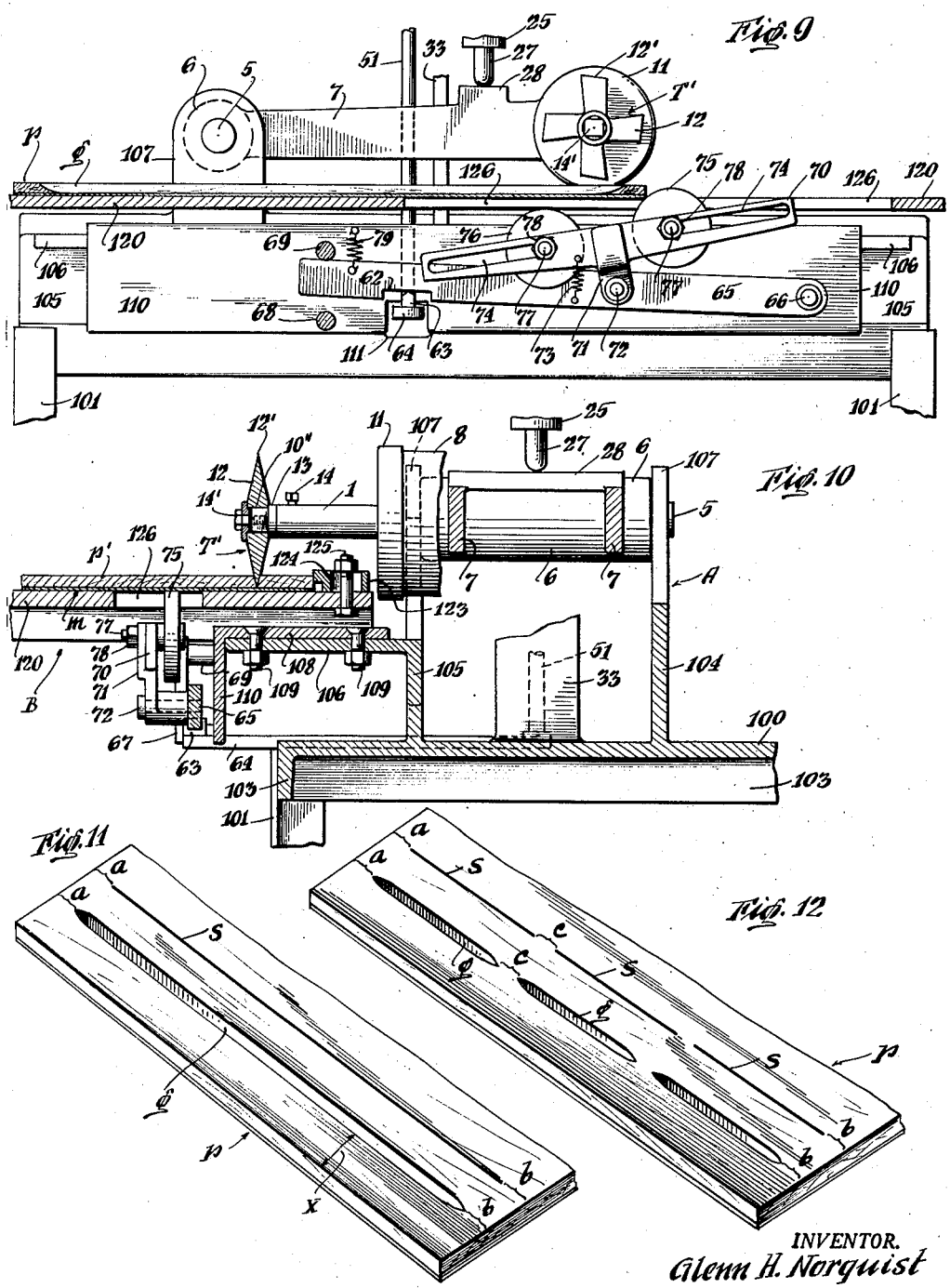

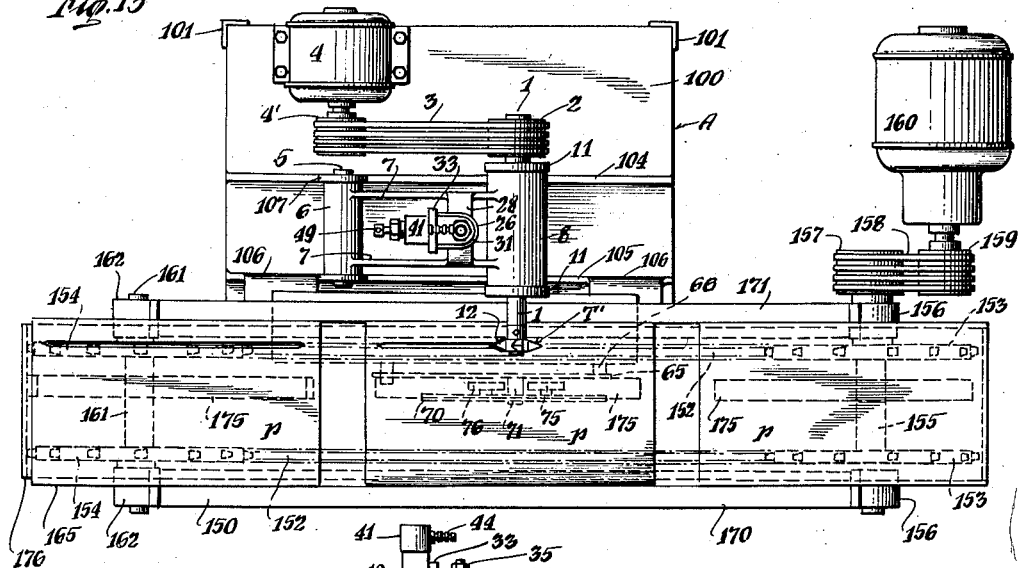
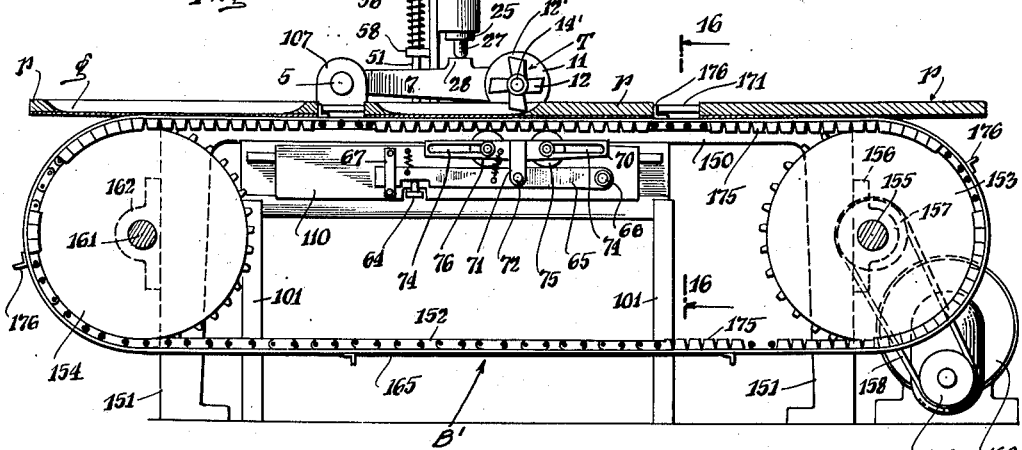

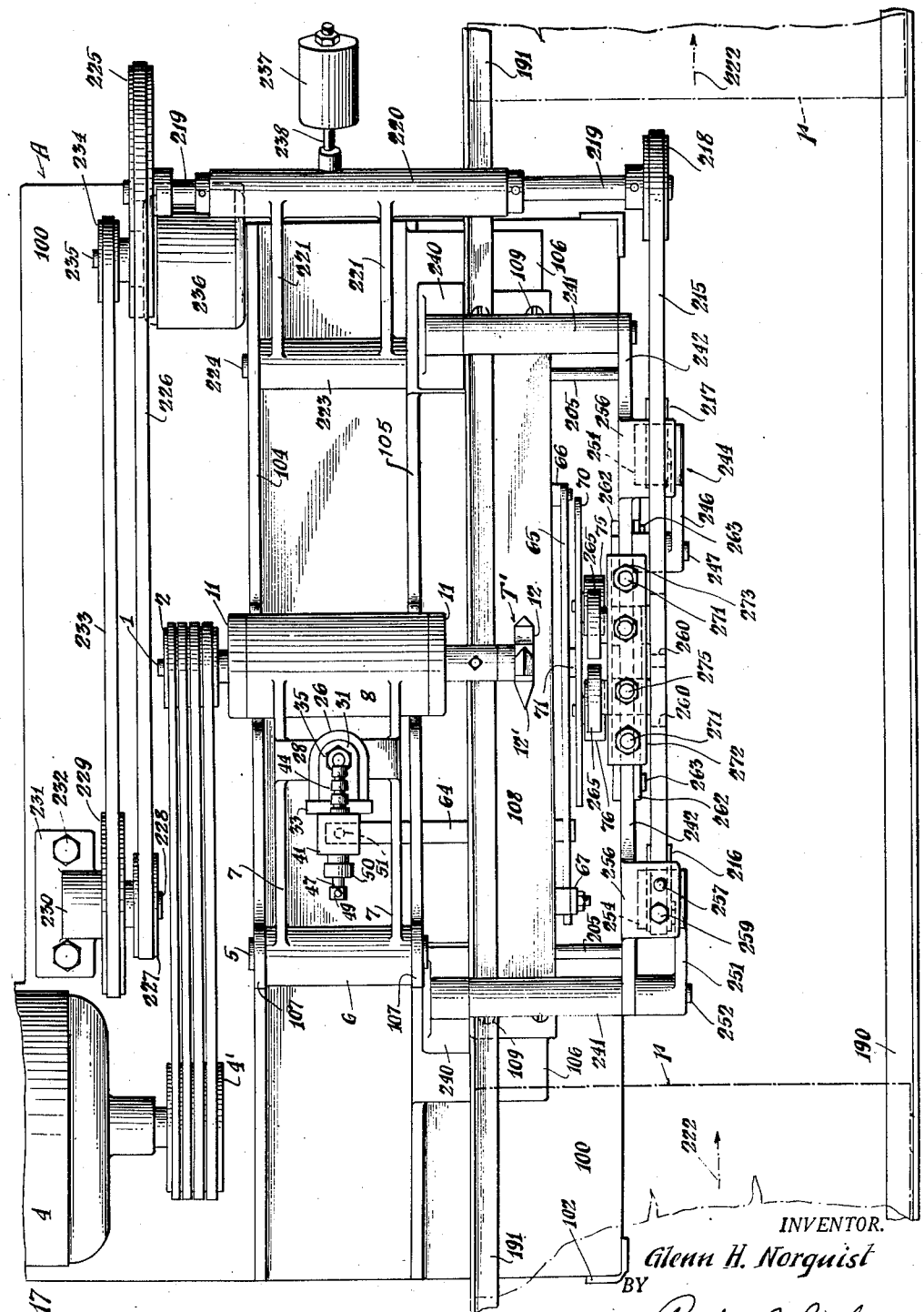

Patented May 2, 1950

2,505,788

UNITED STATES PATENT OFFICE 2,505,788

AUTOMATIC LINE FORMING MACHINE

Glenn H. Norquist, Jamestown, N. Y.

Application October 3, 1944, Serial No. 557,020

17 Claims. (Cl. 90—11)

This invention relates to automatic line forming machines, and more particularly to an improved machine designed to perform grooving, cutting, grinding, welding and other line operations of predetermined length and spacing on various materials and work-pieces with accuracy and precision and at high production speeds with a minimum of attention by the operator.

Various articles manufactured from sheets or panels of wood, plywood, fiberboard, plastics, metal and various composition materials often require strip or line operations thereon of predetermined length and spacing. For example, it is often desirable to form grooves or cuts in work-pieces or materials which are of predetermined length, or which terminate a spaced distance from the ends of the work-piece, or which are of intermittent length, or whose ends are spaced apart a predetermined distance.

Such operations have been customarily performed by the use of hand tools, or by carefully plotting and laying out by the location and length of the grooves, cuts, or line operations to be performed, following which the workmen must carefully guide and control the work tool along the previously prepared demarcations on the work-piece. The accuracy of such line operations depend on the skill and alertness of the operator, and in normal production operations inaccuracies often occur which result in considerable discarded material.

In accordance with this invention, an improved automatic machine is provided to which the desired grooving, cutting, sawing, grinding, welding or other workhead or tool may be attached, and which operates to automatically move the work tool into and out of operative contact with the work-piece so that the line operations to be performed on the work-piece are accurate in length and spacing, without reliance upon the skill of the operator.

In this machine the work tool is under the control of a mechanism associated with the machine, which mechanism is so constructed and arranged as to manipulate the work tool in accordance with the travel of the work-piece itself, or by some other object which travels with the work-piece. For example, the control mechanism may be so arranged and adjusted as to manipulate the work tool away from the work during a predetermined travel of the work-piece adjacent the work tool, and then automatically manipulate the work tool into working engagement with the work-piece until the work-piece has traveled a further predetermined distance. The control mechanism is also adapted to be manipulated by an object which travels along with the work-piece, such as means associated with a traveling conveyor upon which the work-pieces are supported and advanced.

The control mechanism is operatively connected to power means, such as a compressed air cylinder and piston, which serves to manipulate the work tool into and out of operative position. Thus the control mechanism, which is manipulated in accordance with the travel of the work-piece, controls the operation of the power means which in turn manipulates the work tool. The machine is so constructed and designed as to be immediately responsive to the travel of the work piece and to instantaneously bring the work tool into and out of its operative position with respect to the work-piece during its travel under the work tool.

By the use of a machine constructed in accordance with this invention, grooves, cuts, line welds, and numerous other line operations can be performed on work-pieces of various sorts with accuracy and precision without reliance upon the skill and care of the operator, with the attainment of high speed of production at relatively low cost and substantially without loss or waste of material normally resulting from inaccurately performed work.

An object of this invention is to provide an improved machine for automatically performing grooving, cutting, welding, striping, and other line operations on various work-pieces with accuracy and precision, and at high production speeds by relatively unskilled labor.

Another object of this invention is to provide an automatic machine to which work-tools, such as grooving, cutting, grinding, and sanding wheels, welding heads, and striping devices may be attached, which has associated therewith control mechanism for automatically manipulating such work tool in a predetermined manner into and out of working contact with the work-piece during its travel in the path of the work tool.

Another object of this invention is to provide an improved automatic machine designed to manipulate a work tool into and out of operative engagement with work-pieces traveling in the path of the work tool whereby line operations of accurate predetermined length and spacing may be performed on a work-piece.

Other objects and advantages of this invention will become apparent as the disclosure proceeds.

Although the characteristic features of this invention will be particularly pointed out in the claims appended hereto, the invention itself and the manner in which it may be carried out may be better understood by referring to the following description taken in connection with the accompanying drawings forming a part hereof, in which Fig. 1 is a top plan view of the machine equipped with a rotary grooving tool and a feed table associated therewith;

Fig. 2 is an end elevational view of the machine and associated feed table shown in Fig. 1;

Fig. 3 is a side elevational view of the machine shown in Fig. 1 with the feed table shown in the immediate background;

Fig. 4 is a top plan view of the machine, certain parts being shown in cross-section to illustrate certain structural features thereof;

Fig. 5 is a side elevational view of the machine with certain parts thereof shown in cross-section to illustrate further details thereof;

Fig. 6 is an end elevational view of the machine, certain parts being broken away to illustrate further structural details thereof;

Fig. 7 is a side elevational view showing the lower portion of the machine, and particularly the position of certain operating parts of the control mechanism as the work-piece moves into position;

Fig. 8 is a side elevational view of the lower portion of the machine showing the position of the control mechanism as the cutting operation progresses;

Fig. 9 is a side elevational view of the lower portion of the machine showing the position of the control mechanism when the cutting operation has been completed;

Fig. 10 is a transverse cross-sectional view through the lower portion of the machine as it appears when viewed along line 6—6 of Fig. 4;

Fig. 11 is a perspective view of a fragmentary portion of a panel or work-piece illustrating a groove and a cut line formed therein by the automatic machine in which the groove and cut line are substantially continuous but terminate short of the ends of the panel;

Fig. 12 is a perspective view of a panel or work-piece showing intermittent grooves and intermittent cuts formed therein by the automatic machine forming the subject matter of this invention;

Fig. 13 is a top elevational view of the automatic machine having a belt conveyor associated therewith for advancing the work-pieces, the conveyor having means cooperating with the control mechanism associated with the machine for regulating the length and spacing of the grooves or cuts formed in the work-piece;

Fig. 14 is a side elevational view of the automatic feed conveyor shown in Fig. 13 with the associated automatic machine illustrated in the immediate background;

Fig. 15 is a fragmentary perspective view showing the under surface of the conveyor belt equipped with drive chains and tracking blocks for operating the control mechanism;

Fig. 16 is a transverse cross-sectional view through the continuous feed conveyor as it appears when viewed along line 16—16 of Fig. 14, this view also showing an end elevational view of the automatic cutting machine;

Fig. 17 is a top plan view of the machine having associated therewith an arrangement of cooperating belts for feeding and advancing the work-pieces under the work tool;

Fig. 19 is a perspective view of a circular saw which may comprise the work tool adapted for attachment to the machine;

Fig. 20 is a perspective view of a rotary grinding or sanding wheel comprising another work tool adapted for attachment to the machine;

Fig. 21 is a perspective view of a welding head comprising a work tool adapted for attachment to the machine; and Fig. 22 is a perspective view of a striping brush comprising a work tool adapted for attachment to the machine.

Similar reference characters refer to similar parts throughout the several views of the drawings and specification.

Figure 18:
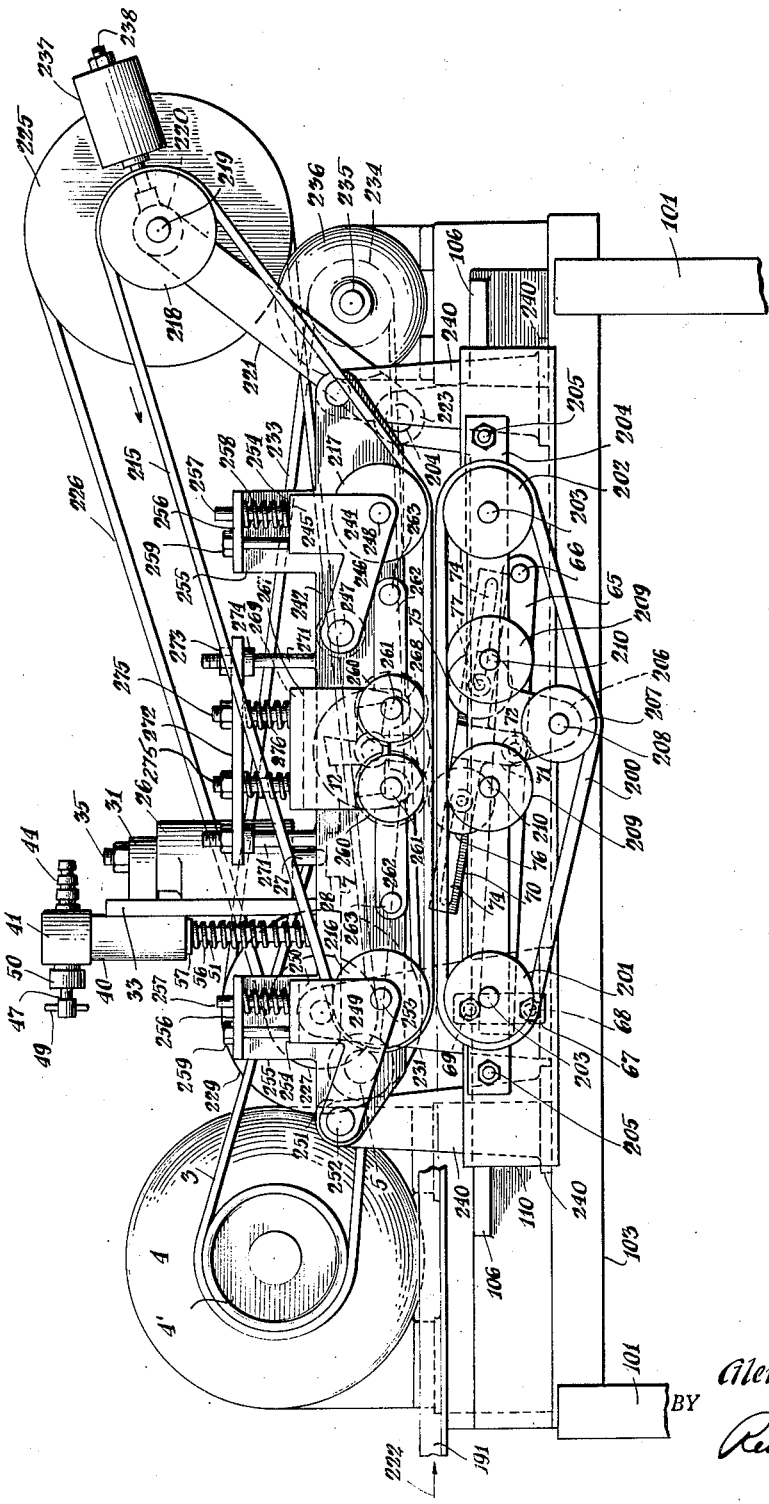
Fig. 18 is a side elevational view of the cooperating feed belts and work-pieces advancing mechanism shown in Fig. 17.

The automatic machine of this invention is designed to perform cutting, grooving, sawing, or similar straight line operations on work-pieces of various sorts, particularly relatively flat work-pieces, by attachment to the machine of an appropriate work tool. Work-pieces or panels of almost any material may be operated upon, and particularly such materials as wood, plywood, fiberboard, metal, or a combination of one or more such materials. If a groove $g$ is to be cut from the work-piece $p$, a suitable rotary grooving tool $T'$ is used. Where the work-piece is to be cut, a suitable rotary saw $T^2$ of the type adapted to cut the work-piece material is selected. By the use of a work tool the nature of a welding head $T^4$, a grinding wheel $T^3$, or striping instrument $T^5$, operations such as seam welding, grinding or strip coating may be performed on the work-piece. It is therefore understood that where the word "grooving" or "cutting" is used, such term is intended to embrace other operations which this automatic machine is adapted to perform by attachment of the appropriate work tool thereto.

The machine constituting this invention is particularly characterized by control mechanism activated by the movement of the work-piece to regulate and control the work tool, and particularly to control the movement of the work tool into and out of operating engagement with the work-piece as the work-piece advances under the work tool whereby line operations may be performed on the work-piece of any desired length, or intermittent spacing. As shown in Fig. 11, for example, a work-piece or panel $p$ is shown having a groove $g$ and a saw cut $s$ therein spaced a predetermined distance ($a$ and $b$) from the ends of the panel. Fig. 12 illustrates a panel $p$ having a series of aligned grooves $g$ and cuts $s$ whose ends are spaced apart a predetermined distance $c$. These operations can be performed by the use of this machine with accuracy and precision and at high production speeds by a relatively unskilled operator.

As illustrative of this invention, there is shown in Figs. 1 to 4 inclusive the automatic cutting machine A having associated therewith a simple form of feed table B for supporting the work-piece or panel $p$. For the purpose of illustration only, the work tool is shown as comprising a grooving wheel $T'$, but it will be appreciated that a circular saw $T^2$, welding head $T^4$, grinding wheel $T^3$, or striping tool $T^5$ may be used.

The automatic cutting machine A comprises a base plate or table 100 supported upon suitable legs 101, the table having a reenforcing frame 103 extending around the same. Certain operating parts of the machine are supported upon a pair of spaced parallel extending bed frames 104 and 105, which if desired may be formed integrally with the table 100. The work tool may be supported upon the end of a work shaft 1, and if the work tool is of the driven or rotary type, a drive pulley or sheave 2 may be attached as by a spline 2' to the end of the shaft 1. The sheave 2 may be driven by V-belts 3 trained over the drive sheave of a motor 4, which may be supported upon the table 100.

The work shaft 1 which supports the work tool is mounted for vertical swinging movement about a fixed shaft 5, the shaft 5 being secured in raised shoulders 107 formed on the bed frames 104 and 105, as shown more particularly in Fig. 1. A sleeve 6 is journalled to swing or rotate on the fixed shaft 5 which extends therethrough. A pair of spaced arms 7 are attached at one end thereof to the sleeve 6. A barrel housing 8 is permanently fixed to the other end of the spaced arms 7. The work shaft 1 may be rotatably supported within the barrel housing 8 by means of roller bearings comprising a fixed bearing sleeve 9 fixed to the interior surface of the housing 8, and a rotatable bearing sleeve 10 which grips the shaft 1, roller bearings 10' moving in raceways between the fixed bearing sleeve 9 and the rotatable bearing sleeve 10. A cap plate 11 is screwed on to each end of the barrel housing 8 and serves to keep the bearings in position and retain lubrication.

The work tool illustrated in Figs. 1 to 10 inclusive is a rotary driven grooving tool T' of standard design having cutting arms 12 presenting tapered cutting ends 12'. The tool is attached to the end of a polygonal shaped stub shaft 13 which is adapted to be inserted into a correspondingly shaped socket in the end of the work shaft 1, so as to positively rotate therewith, the stub shaft 13 being further held in position by a set screw 14. The rotary work tool may be secured to the end of the stub shaft 13 by a suitable cap screw 14'.

It will be noted that the barrel housing 8 which supports the work tool and the work shaft 1 contained in the housing is normally free to swing or pivot about the fixed shaft 5. Means are provided to normally maintain the work tool 12 in spaced relation to the work-piece p by a coil compression spring 15, whose lower end rests upon the table top 100 and is secured thereto by a fastening element 15', the upper end of the coil spring 15 being attached to a fastening element 15'' fixed to the under surface of the barrel housing 8 between the ends thereof. The compression spring 15 normally serves to exert a predetermined lifting force on the barrel housing 8, so as to maintain the work shaft 1 journalled therein in normally raised position so that the work tool attached to the end of the shaft 1 is raised out of working contact with the work-piece p.

Means are provided, actuated as by compressed air, for forcing the barrel housing 8 downwardly against the action of the compression spring 15, so as to press the work tool into operating contact with the work. As shown more particularly in Fig. 5, a supporting standard 33 is provided which extends vertically from the table 100 and between the spaced pivot arms 7. An air cylinder 26 is secured to the standard 33 as by means of screws 34. An air piston 25 is arranged to reciprocate in the air cylinder 26, the air piston 25 having a nose 27 projecting from the lower end thereof adapted to press against a strut plate 28 which extends between and is permanently secured to the spaced pivot arms 7.

The upper end of the cylinder 26 is closed by a cylinder head 29 which has an air passage 30 extending therethrough. A header piece 31 is attached to the cylinder head 29 by an attaching bolt 35 to provide a leak-proof connection. The header piece 31 has an air passage 32 therein, which leads to the air passage 30 in the cylinder head 29. The header piece 31 may be provided with a threaded nipple 36, which is threaded into and extends through the standard 33 and through the wall of an air control sleeve 40.

The upper end of the air control sleeve 40 has threaded thereto a valve head 41 which has an air passage 43 therein leading to the interior of the control sleeve 40. The valve head 41 has projecting therefrom an air hose attaching nipple 44, which is provided with an air passage 45, which leads to the air passage 43 inside the valve head. An air hose 42 may be attached or secured to the nipple 44 by any suitable clamping device.

The air pressure and the volume of air flowing into the control sleeve 40 may be controlled by a needle valve 46 having a pointed end adapted to be adjusted in relation to a valve seat 46' provided on the interior of the valve head 41. The valve needle 46 is provided with a stem 47 having a threaded portion 48, which threads into the body of the valve head so that the valve stem 47 can be manipulated by means of a handle 49 attached thereto. A sealing cap 50 surrounds the valve stem 47, the sealing cap 50 having a threaded flange which permits the same to be attached in airtight arrangement to the valve head 41, and prevents the escape of air through the valve head along the needle stem.

It is now seen that compressed air may be admitted from the hose line 42 into the valve head 41, the air then flowing through the control sleeve 40, through passage 32 in the header piece 31, and thence through passage 30 in the cylinder head 29, and into the cylinder 26 where the compressed air would normally operate to drive the piston head 25 downwardly. Movement of air into the passage 32 of the header piece 31 is controlled by a valve piston 55, which reciprocates in the control sleeve 40, so as to close off or admit air into the mouth of passage 32 in the header piece 31. The valve piston 55 is in turn operated by control mechanism, which is actuated by travel of the work-piece under the work tool 12, as will now be more fully described.

The piston valve 55 reciprocating in the control sleeve 40 is attached to the upper end of a control rod 51. A guide 52 is attached to the upper end of the rod 51 immediately below the valve piston 55 and is shaped to have a smooth sliding fit within the control sleeve 40. The control rod 51 also carries a stop collar 57 which normally abuts the lower end of the control sleeve 40. A coil compression spring 56 extends around a section of the control rod 51, the upper end of the coil spring 56 abutting against the collar 57, and the lower end thereof resting on a fixed collar 58 permanently secured to the vertical standard 33. The rod 51 is free to reciprocate in the collar 58, but the coil spring 56 normally retains the stop collar 57 seated against the lower end of the control sleeve 40, in which position the valve piston 55 blocks off passage of air in the control sleeve 40 so that no air can pass into the passage 32 of the header piece 31, and into the air cylinder 26. However, when a sufficient downward force or pull is applied to the vertical control rod 51, the coil spring 56 may be compressed sufficiently to carry the valve piston 55 below the mouth of the air passage 32 in the header piece 31, and thus permit compressed air to freely flow through the control sleeve 40 and into the air passage 32 in the header piece 31, and thence into the air cylinder 26. The control mechanism for exerting a downward pulling force on the control rod 51 will now be described.

As shown more particularly in Figs. 4, 6 and 10, a shelf 106 projects laterally from the bed frame 105 of the machine. The shelf 106 provides means to which the control mechanism presently to be described may be attached. An angle shaped plate has one leg 108 thereof attached to the shelf 106 as by means of bolts or screws 109 and a downwardly projecting leg 110 which supports the control mechanism. The control mechanism comprises a pivot bar 65, one end of which is pivotally attached to the downwardly extending leg 110 by means of a suitable pivot pin 66. The other end of the bar 65 is free to swing between spaced bolts or studs 68 and 69, which are secured to the supporting leg 110. A spaced plate 67 is secured to and extends between the studs or bolts 68 and 69, so as to maintain the free end of the bar 65 in operative position between the bolts or studs 68 and 69. A laterally extending bar 64 is fixedly and rigidly secured to the lower end of the control rod 51, as shown more particularly in Figs. 4, 5, 6, 7 and 8. The free end of the horizontal control bar 64 extends underneath the edge of pivoted bar 65. The free end of the horizontal control bar 64 may be provided with a fulcrum point 63, which is normally in engagement with the notched edge 62 of the pivot bar 65. A suitable aperture 111 is cut into the leg 110 through which the end of the horizontal control bar 64 extends. It will now be noted that by exerting downward pressure on the pivot bar 65, this pivot bar can be brought to rest against the lower stud 68, and simultaneously downward pressure is exerted on the horizontal control bar 64 so as to draw the control rod 51 downwardly, and move the valve piston 55 thereto attached below the mouth of the air passage 32 in the head piece 31.

Means are provided for exerting downward pressure upon the pivoted bar 65, so as to permit compressed air to flow into the air cylinder 26, which means is automatically operated by the travel of the work-piece under the work tool 12. As shown more particularly in Figs. 6 to 10, inclusive, a rocker bar 70 is attached at the midsection thereof to a fulcrum plate 71 whose lower end is pivotally secured by means of a pivot pin 72 to the pivot bar 65 at a point intermediate the ends thereof and under the work tool. The rocker bar 70 is normally held in tilted position, as shown in Fig. 5, by means of a coil spring 73, one end of which is attached to the rocker bar 70, and the other end attached to the pivot bar 65. A pair of tracking wheels 75 and 76 are each rotatably mounted on a stud 77, one end of which extends through an elongated slot 74 formed in each end of the rocker bar 70. The tracking wheels 75 and 76 are positioned at opposite sides of the fulcrum plate 71 and can be adjusted to any desired spaced relationship by moving the stud shafts 77 along the slots 74. The stud shafts 77, which support the tracking wheels, may be fixed in desired spaced relationship by manipulating a lock nut 78 attached thereto.

It will thus be noted that the rocker bar 70, and its associated tracking wheels 75 and 76, are directly supported upon the pivot lever 65 and until a predetermined downward pressure is exerted on both the tracking wheels 75 and 76, the pivot lever 65 is maintained in the position shown in Figs. 7 or 9, in which position the free end of the pivot lever 65 abuts against the upper stud bolt 69. If desired, a coil tension spring 79 may be provided to retain the pivot lever 65 in its raised position, one end of the coil spring 79 being attached to the pivot lever 65 and the other end thereof attached to the depending flange 110, which forms a part of the machine frame work.

It will be further noted that the advance tracking wheel 75 is normally held at a higher elevation than the following tracking wheel 76 by the light coil spring 73. When downward pressure is exerted only on the advance tracking wheel 75, the rocker bar 70 is tilted in the opposite direction, as shown in Fig. 7, against the action of the coil spring 73 so as to depress the advance wheel 75 and raise the following wheel 76. The tilting of the rocker bar 70 in the manner indicated may be accomplished without depressing the free end of the pivot bar 65. However, if a predetermined downward pressure is exerted on both the tracking wheels 75 and 76, as by means of an object passing thereover, a downward force will be exerted against the pivot bar 65 so as to bring the free end thereof into abutment with the lower stop stud 68, as shown in Fig. 8, and this movement of the pivot bar 65 will exert a corresponding downward thrust on the horizontal control bar 64 sufficient to pull the control rod 51 downwardly against the action of the coil compression spring 56, and thus locate the valve piston 55 attached to the end of the control rod 51 below the mouth of the air passage 32 in the header piece 31.

Downward pressure may be exerted on the tracking wheels 75 and 76 either by the passage of the work-piece over the tracking wheels, or by the provision of an undulating track associated with a traveling conveyor, which advances the work-pieces under the work tool. As illustrated in Figs. 1, 2, 6, 7, 8, 9 and 10, the work-piece p is positioned to travel over the tracking wheels 75 and 76 in the manner to exert the desired pressure on the tracking wheels 75 and 76, so as to manipulate the control rod 51 in the desired manner. As for example in Fig. 7, the work-piece p comprising a flat panel is shown in the process of being advanced under thte work tool T', the front end of the panel resting upon and depressing the advance tracking wheel 75, the advancing end of the work-piece panel p having not yet contacted or depressed the following tracking wheel 76. When the tracking wheels 75 and 76 are in the position shown in Fig. 7, the pivot bar 65 has not been depressed and the valve piston 55 has not been manipulated to admit compressed air into the air cylinder 26. Consequently, the compression spring 15, which supports the barrel housing 8, is maintained in its full raised position with the work tool 12 out of contact with the work-piece.

However, when the advance end of the work-piece p has been advanced sufficiently to contact and depress the following tracking wheel 76 in the manner shown in Fig. 8, the tracking wheels 75 and 76 have been levelled off to track along the under surface of the panel work-piece p and depress the pivot bar 65. The moment the pivot bar 65 has been depressed in the manner shown in Fig. 8, the control rod 51 pulls the valve piston 55 attached to the end thereof below the mouth of the air passage 32 in the header piece 31, thereby admitting compressed air to the air cylinder 26, which exerts pressure on the strut block 28, forcing the barrel housing 8 downwardly against the action of its supporting compression spring 15, thereby bringing the work tool into operative engagement with the work-piece p. The work tool 12 is maintained in condition to operate at all times, and if the work tool is a rotating tool, it is kept constantly rotating by the driving motor 4. Therefore the moment the work tool 12 is brought into operating relation with the work-piece p, the desired grooving, cutting, welding, or lining operation which the work tool is equipped to perform, proceeds. It will be noted that the relative spacing of the tracking wheels 75 and 76 determines the beginning point of the line operation. For example, where a rotary grooving or rotary cutting tool is used, the relative spacing of the following tracking wheel 76 from the pivot plate 71 determines the distance a, as shown in Fig. 11, where the grooving or cutting operation is to begin in relation to the advance end of the panel work-piece.

As panel work-piece p is continuously advanced under the work tool the desired line operation is performed on the work-piece. If the line operation is to terminate a distance b from the trailing end of the panel work-piece p, the advance tracking wheel 75 is so positioned in reference to the pivot plate 71 as to move out of engagement with the trailing end of the panel work-piece when the work tool has reached a predetermined distance b from the trailing end of the work-piece. As shown in Fig. 9, for example, the trailing end of the panel work-piece p has advanced beyond the advance tracking wheel 75 so that the rocker arm 70 is permitted to tilt under the influence of coil spring 73, thereby releasing the downward pressure on the pivot bar 65 so that the coil spring 56 is free to raise the control rod 51 and move the valve piston 55 at the end thereof above the mouth of the air passage 32 in the header piece 31, thereby closing off further movement of compressed air into the air cylinder 26, and permitting the escape of compressed air from the cylinder 26 out through the blow hole 54 in the control sleeve 40. It will be noted that the blow hole 54 is closed off by the valve piston 55 when the valve piston 55 has been moved below the mouth of the air passage 32 in the header piece 31, so that compressed air can only escape from the air cylinder when the valve piston has been raised to a position above the mouth of the air passage 32 in the header piece 31. When the air pressure has been removed from the air piston 25, the coil spring 15 which supports the barrel housing 8 immediately raises the barrel housing 8 to its normally raised position the work tool is raised out of contact with the work-piece p. By shifting the advance tracking wheel 75 along its supporting slot 74, the end of the line operation may be terminated at any desired predetermined distance b from the trailing end of the work-piece p.

The depth of the groove g or cut s may be regulated and controlled by placing a corresponding limitation on the downward movement of the air piston 25. For example, the lower end of the air cylinder 26 may be provided with an inwardly extending lip 90 in which a set screw 91 is threaded. A cavity 92 is provided in the lower end of the air piston 25 into which the threaded shank of the set screw 91 extends. When the air piston 25 is under the influence of compressed air and has been forced to its extreme downward position, the upper wall 93 of the cavity 92 will rest against the upper end of the set screw 91. By suitable adjustment of the set screw 91, the downward stroke of the air piston 25 may be regulated and determined. The air piston 25 reaches its extreme upper stroke when the upper end of the air piston strikes the abutments 93 projecting inwardly from the interior wall of the air cylinder 26. The compression spring 15 which supports the barrel housing 8 is sufficiently strong to normally maintain the air piston 25, when not under the influence of compressed air, in its extreme upstroke position with the upper end of the air piston 25 abutting against the projecting abutments 93'. It will thus be apparent that by a proper adjustment of the set screw 91, the downward stroke of the air piston 25, when under the influence of compressed air, may be regulated, thereby also regulating and controlling the depth of the groove g or cut s in the work-piece or panel p. It will also be appreciated that the necessary downward pressure of the work tool against the work-piece to perform the desired line operation is regulated and controlled by the pressure of the compressed air which is exerted against the upper end of the air piston 25. This air pressure is controlled by a suitable adjustment of the valve stem 46 by means of the needle valve handle 49.

Where the work-piece itself is used as a means to pivot the rocking bar 70, which supports the tracking rollers 75 and 76, a feed table in a form more particularly illustrated in Figs. 1, 2, 3 and 6 may be conveniently used. This feed table may comprise a table top 120 supported upon suitable legs 121. The table top 120 may be somewhat longer than the length of the table 100 of the line forming machine A, so that a side edge of the feed table 120 overhangs the shelf 106 of the line forming machine A, as shown more particularly in Figs. 1, 2 and 6. The feed table 120 may be provided with an aperture 126 through which the tracking rollers 75 and 76 may extend so that they may freely track along the panel work-piece p as the work-piece is moved along the top surface of the feed table 120.

The feed table 120 may be provided with suitable spaced guide strips 122 and 123 for guiding the work-piece panel p during its advance movement therebetween. The guide strips 122 and 123 may be adjustably secured to the table top 120 by means of bolts 125, which extend through transverse slots 124 in the guide strips. Thus the guide strips may be spaced apart the desired distance necessary to conveniently accommodate and guide the work-piece panel p therebetween.

It will be seen that the line formation may be applied to the work-piece panel p any desired distance from the side edges thereof by adjusting the position of the work tool the desired distance x from the side edge of the panel. This setting of the work tool is accomplished by unloosening the set screw 14 so as to permit the tool shank 13 to be telescoped to the desired location in the socket formation of work shaft 1, thereafter resetting the set screw 14 to maintain the work tool in the desired position with respect to the side edge of the work-piece panel p. It will be appreciated that line formations may thus be applied to the work-piece panel p, which extend substantially parallel to the side edge, or at any desired angle to the side edge of the panel by arranging the guide strips 122 and 123 so that the panel p therebetween is advanced under the work tool at the desired angle with reference to the work tool.

It will be appreciated that the work table B, as above described, and the line forming machine A are preferably secured to the plant floor in the desired cooperating relationship with respect to each other, so that the line operations may be continuously performed at a high reduction rate, and with accuracy and precision.

To further speed up production operations, a continuous feed conveyor B' may be associated with the line forming machine A. For purpose of illustration, there is shown in Figs. 13, 14 and 16, one type of feed conveyor which may be used for continuously advancing the work piece-panel p into operating relation with respect to the work tool attached to the line forming machine. The continuous belt conveyor here shown may comprise a suitable table frame 150 supported on legs or pedestals 151 which rest on the factory floor. A pair of continuous spaced link chains 152 are trained over a pair of large sprocket wheels 153 at the feed end of the conveyor and over a pair of large sprocket wheels 154 at the discharge end of the conveyor. Sprockets 153 at the feed end of the conveyor are secured to a shaft 155 rotatably mounted in bearing blocks 156 secured to the adjacent legs or pedestals 151 of the conveyor. The sprockets 153 may be driven by a pulley 157 fixed to the projecting end of the sprocket shaft 115, V belts 158 being trained around the pulley 157 and around pulley 159 attached to the shaft of the driving motor 160. The sprockets 154 at the discharge end of the machine are fixed to a suitable shaft 161 rotatably mounted in bearing blocks 162 attached to the adjacent supporting legs 151 at the discharge end of the conveyor.

A continuous conveyor belt 165, which may be formed of fabric, rubber, belt forming slats, or any other suitable material, rests upon and is secured to and supported by spaced conveyor chains 152, as shown more particularly in Fig. 15. Securing plates 166 fixed to and forming an integral part of the chain links may be provided with means for securing the belt 165 to the spaced conveyor chain 152. It will be appreciated that this conveyor belt 165 may be constructed in any desired manner sufficient to support and advance the work-pieces p into and out of operating relationship with respect to the work tool.

It will be noted by referring more particularly to Figs. 13 and 16, that one side edge of the conveyor belt extends under the work tool so that the work-piece p supported thereon may be brought into proper operating relationship with respect to the work tool.

The table frame 150 of the conveyor B' may be so arranged, as shown in Fig. 16, as to further assist in supporting the adjacent side edges of the conveyor belt 165. Guide strips 170 and 171 secured to the table frame 150, as by adjustable bolts 172, may be provided to guide the work-piece panel p advancing therebetween.

The tracking rollers 75 and 76, which control the position of the work tool 12, may be manipulated by the provision of track forming segments 175 attached to the underside of the conveyor belt 165, and so arranged as to provide a track on which the tracking rollers 75 and 76 may roll as the conveyor belt advances. The tracking block segments 175 may be removably secured in any desired manner to the underside of the belt 165, and may be arranged to provide track sections of any desired length and spacing. The upper face of the belt is provided with stop strips 176 adjustably and removably secured to the belt in any desired manner, so as to maintain the work-piece panel p placed on the belt in fixed position as the panels p are advanced thereon. The track segments 175 are secured to the underside of the belt in proper relation to the work-piece panel p super-imposed immediately thereover so that the tracking rollers 75 and 76 will roll onto, along and off the track segments so as to produce the desired motion to the rocking bar 70, which in turn manipulates the valve control rod 51. Thus it will be appreciated that by providing track sections formed by the track segments 175 of the desired length and spacing, that vertical manipulation of the work tool into and out of operative position can be accurately and precisely gauged and controlled, care being taken that the work-piece panels p are located and held by strips 176 upon the feed belt in proper relation to the track sections on the underside of the belt.

In most production operations it will be appreciated that a large number of work-piece panels of the same length are to be operated on, so that once the track segments 175 and the panel holding strips 176 have been properly located and adjusted, the entire production run can be made without further adjustment of these parts. Obviously various different devices may be employed for movably retaining the track segments 175 to the conveyor belt 165. By forming track sections from segments 175 as illustrated, it will be appreciated that the belt may be run along the curvilinear path defined by the sprocket wheels 153 and 154, and the supporting chains 152 trained thereon, without causing distortion or imposing undue strains on the belt.

By the provision of track sections to the underside of the conveyor belt which serve to manipulate the tracking rollers 75 and 76, it will be appreciated that line formations may be imposed upon the work-piece panel of any desired length and spacing. As illustrative of the various line operations which can be performed, there is shown in Fig. 11 a section of a work-piece panel p having a groove g cut therein by means of a rotary grooving tool T' applied to the work shaft 1, the advance end of the groove g being spaced an accurate predetermined distance a from the advancing end of the panel, the opposite end of the groove g being spaced a predetermined distance b from the trailing end of the panel. By the use of a work tool comprising a rotary saw T² attached to the work shaft 1 of the machine, a saw cut s may be formed in the panel, whose advance end is spaced a desired predetermined distance a from the advance end of the panel its trailing end being spaced a desired predetermined distance b from the trailing end of the panel.

By the use of a continuous conveyor of the type B' as shown in Figs. 13, 14 and 16, the track sections can be arranged on the belt so that the work tool will form intermittent grooves g, cuts s, or other intermittent line operations, which are spaced apart a desired predetermined distances c, as illustrated in the panel section shown in Fig. 12. It will be appreciated that by providing track sections of the proper length and proper spacing, and by locating the work-piece panel on the belt in proper relation to the track sections, the tracking rollers 75 and 76 may be manipulated to bring the work tool into and out of engagement with the work-piece so as to form line operations thereon of any desired length and spacing. It will also be appreciated that by adjusting the position of the guide strips 122 and 123, the work-piece panel may be guided therebetween in a manner to perform line operations extending at almost any desired angle with respect to the side edge of the panel. The line of operation may be spaced any desired distance from the side edge of the panel by adjusting the position of the stud shaft 13 of the work tool in the socket provided in the work shaft 1.

There is shown in Figs. 17 and 18 a feed belt mechanism which may be associated with the automatic cutting machine A operative to positively advance the work-pieces under the work tool. In the arrangement here shown the work-pieces p may rest upon suitable tracks or supports, such as an outer rail 190 and an inner rail 191. The feeding mechanism here shown comprises a lower feed belt 200 and an upper feed belt 215 arranged so that the work-piece is gripped between the upper run of the lower feed belt 200 and the lower run of the upper feed belt 215. The lower feed belt 200 is trained around spaced idling rollers 201 and 202 each journalled upon a suitable stub-shaft 203. The stub-shafts 203 are supported by a horizontal extending bar 204 fixed at each end thereof to a stud bolt 205 projecting laterally from the downwardly extending flange 110 of the machine. The supporting bar 204 is also provided with an offset portion 206 formed integrally therewith, which supports a stub-shaft 208 upon which a third belt pulley 207 is rotatably mounted. Thus the lower feed belt 210 is tautly trained around the guide pulleys 201, 202 and 207, in a manner so that the upper run thereof provides a support upon which the work-piece may rest.

The upper feed belt 215 is trained around a pair of spaced pulleys 216 and 217 which maintain the lower run of the belt 215 in substantial parallelism with the upper run of the lower feed belt 200 so as to grip the work-piece therebetween. The upper feed belt 215 is held taut by a pulley 218 which also drives this feed belt. As shown more particularly in Fig. 17, the pulley 218 is fixed to a horizontally extending shaft 219 rotatably mounted in a sleeve 220. The sleeve 220 is supported upon a pair of spaced bracket arms 221 whose ends are fixed to a sleeve 223 journalled on a pinion shaft 224 fixed to the bed frames 104 of the machine. Driven shaft 219 also carries a pulley wheel 225 around which a drive belt 226 is trained. The pulley wheel 225 is driven by a motor 236, which may be supported upon the top of the table 100, by means of a suitable speed reducer arrangement illustrated in simple form more particularly in Fig. 17. As shown, drive belt 226 may be trained around a small diameter pulley 227 rotatably mounted on a stub-shaft 228, one end of which is fixed in a fitting 230 supported by a bracket 231 fixed to the table top 100 by suitable bolts 232. A larger pulley wheel 229 is fixed to the smaller pulley wheel 227 and is rotatably mounted on the stub-shaft 228. A drive belt 233 is trained around the larger pulley wheel 229, and also around a smaller pulley wheel 234 fixed to the shaft 235 of the driving motor 236. By means of the drive mechanism above described, it will be noted that the driven shaft 219 and the upper feed belt 215 may be driven at the desired speed, so that the lower run of the upper feed belt 215 will grip the work-piece and advance the work-piece under the work tool T at the desired operating speed. The upper feed belt 215 is maintained in taut condition at all times by a counterweight 237 adjustably secured to a supporting pin 238 fixed to the sleeve 220 which supports the driven shaft 219.

The guide pulleys 216 and 217 for the upper feed belt 215 are so mounted and arranged as to exert a predetermined pressure upon the lower run of the feed belt 215, so that this lower run will grip the work-piece and advance the work-piece at the same speed as the belt. The lower feed belt 200 is not driven, but when the upper run thereof is in gripping contact with the work-piece, the upper run of the belt 200 will advance parallel with and at the same speed as the lower run of the upper feed belt 215. The work-piece is advanced in the direction of the arrow 222, as shown in Figs. 17 and 18, until the advance end thereof is gripped between the adjacent runs of the feed belts 200 and 215, and is then advanced between these belts at the same traveling speed as the upper belt until discharged upon the spaced trackways 190 and 191.

The guide pulley 217 is rotatably mounted upon a stub-shaft 243 fixed to a V-shaped bracket 244 having an upwardly extending leg 245 and a laterally extending leg 246. The laterally extending leg 246 is swingably mounted upon a stud pin 247 projecting from a horizontal extending frame member 242. The frame member 242 is supported at each end thereof by a laterally extending arm 241, one end of which is fixed to a bracket 240 supported upon and fixed to the table top 100 of the machine. The belt pulley 216 is likewise rotatably supported upon a stub-shaft 253 projecting from a V-shaped bracket 249 having an upwardly projecting leg 250 and a laterally projecting leg 251. The laterally projecting leg 251 is swingably supported from a suitable stud pin 252 laterally projecting from the horizontal extending supporting bar 242.

Thus it will be noted that the belt pulley 216 is adapted to rise and fall with the vertically swinging movement of the laterally extending leg 251 of the V-bracket 249, and similarly, belt pulley 217 is adapted to rise and fall with the swinging movement of the leg 246 of V-bracket 244 which is pivotally mounted on a stud pin 247. A predetermined downward pressure, however, is exerted upon the upwardly extending leg 245 of V-bracket 244 and the upwardly extending leg 254 of V-bracket 249, so that the belt pulleys 217 and 216 which they carry will exert a predetermined downward pressure upon the lower run of the upper driven feed belt 215. It will be noted that the horizontal extending supporting bar 242 is provided with a pair of raised lugs 255, each having an overhanging shelf portion 256. A stud member 257 is fixed to and projects downwardly through each shelf portion 256 and supports a compression spring 258, the lower run of which is adapted to rest upon a laterally projecting shelf portion 254. It will be noted that one of the shelf portions 254 extends laterally from the upper end of the upwardly extending leg 245 of V-bracket 244 which supports the belt pulley 217 and the other shelf portion 254 extends laterally from the upwardly extending leg 250 and the V-bracket 249 which supports belt pulley 216. Thus the coil compression springs 258 exert a predetermined downward pressure upon the respective belt wheels 216 and 217, so that the lower run of the upper belt 215 will press against the upper surface of the work-piece with a predetermined pressure. A threaded stop bolt 259 may be threaded through each of the laterally projecting shelf portions 256, so that the lower end thereof will be in a position to abut the adjacent laterally projecting shelf portions 254 of the V-brackets 244 and 249, respectively, so that the respective belt pulleys 216 and 217 cannot be raised beyond a predetermined point.

It is also desirable that pressure be exerted upon the lower run of the upper feed belt 215 at the points between the spaced belt pulleys 216 and 217. For this purpose, a pair of spaced pulley wheels 260 are provided in which the lower run of the belt 215 is guided. Each of the paired belt wheels 260 are fixed to one end of a shaft 261 rotatably mounted on one end of a supporting arm 262, the arm 262 being pivotally mounted upon a stud 263 projecting laterally from the horizontal extending supporting bar 242. It will be noted that the paired belt wheels 260 are positioned on one side of the supporting bar 242 and that their respective shafts 260 extend under the supporting bar 242, and out of contact therewith. A pressure roller 265 is fixed to the opposite end of each shaft 261 and is positioned on the opposite side of the supporting bar 242, as shown more particularly in Fig. 17. The rollers 265 are of such diameter that they will roll against the upper surface of the work-piece and be driven by the belt wheels 260. It will be noted that a vertical line extending through the axis of the work tool T will extend between the peripheries of the paired belt wheels 260 and the associated paired rollers 265. The rollers 265 serve to prevent vibration of the work-piece as it is advanced between the adjacent runs of the belts 200 and 215 and operated upon by the work tool T.

Means are provided for exerting a predetermined downward pressure upon the shafts 261, which support the paired belt wheels 260 and the rollers 265. Such means may comprise a U-shaped saddle member 267 having spaced legs which straddle the horizontal extending supporting bar 242. Each leg of the saddle member 267 is provided with a pair of boss portions 268 through which the shaft 261 extends. A pair of stud bolts 271 extend vertically from the horizontal supporting bar 242 and are each provided with an adjustable nut 274 which supports a horizontal cross bar 272. The cross bar 272 is held in position by a nut 273 threaded over the threaded end of each of the stud bolts 271. A pair of fixed studs 275 project downwardly from the cross bar 272, each stud 275 carrying a compression spring 276 adapted to press against the web 269 of the saddle member 267. Thus it will be noted that the coil springs 276 exert a predetermined downward pressure upon the saddle member 267 and upon the paired shafts 261 rotatably supported in the boss portions 268 of the saddle member. By adjusting the position or elevation of the cross bar 272, the downward pressure exerted on the rollers 265 by the compression springs 276 may be adjusted as desired, so that the rollers 265 will exert a predetermined downward pressure on the work-piece advanced by and between the feed belts 200 and 215.

The feed mechanism illustrated in Figs. 17 and 18 may be conveniently associated with the automatic machine without in any manner interfering with the operation of the tracking rollers 75 and 76 or other mechanism for controlling the cutting or grooving operations to be performed on the work-piece. The feed mechanism above described may be associated with any desired conveyor or support for the work-piece, the supporting trackways 190 and 191 being shown merely as illustrative of one form of work-piece support which may be used.

It will be appreciated that the automatic line forming machines herein described may carry and support any desired form of work tool, which can be suitably attached to the end of the work shaft 1. For example, work tools comprising a grooving wheel T', circular saw T², sanding or grinding wheel T³, and other types of rotary tools may be attached to the work shaft 1 to perform their assigned line operations on the work-piece. Welding and soldering operations may also be performed by attaching a suitable seam welding or seam soldering head T⁴ to the end of the work shaft 1, in which event the work shaft 1 would not be rotated. Striping tools and wheels T⁵ adapted to apply strips of liquid or paste to the work-piece may also be attached to the work shaft 1, the work shaft 1 being driven or not driven as the particular tool requires. Therefore, it will be appreciated that this improved machine is adapted to perform line operations on work-pieces made of various materials by applying the selected work tool to the work shaft 1, with the assurance that the line of operations performed on the work-piece will be properly located and extend the desired distance along the work-piece, and will be properly spaced from the ends of the work-piece, or intermittently spaced from each other as desired. It will also be appreciated that a plurality of spaced work tools may be attached to the work shaft 1, so as to simultaneously apply a plurality of line operations to the work-piece. The machine may also be equipped with a plurality of work shafts 1 each supporting one or more work tools, each shaft being operatively connected to the same or separate control mechanisms as above described. The automatic line forming machine as above described is adapted to be associated with any desired stationary or movable feed table or conveyor, and is designed and adapted to perform line operations on work-pieces with accuracy and precision, and at high production speeds with the minimum of attention by the operator.

While certain novel features of the invention have been disclosed and are pointed out in the annexed claims, it will be understood that various omissions, substitutions and changes may be made by those skilled in the art without departing from the spirit of this invention.

What is claimed is:

1. An automatic line forming machine including in combination, a rotatably mounted work tool, means for substantially continually rotating said work tool, means for supporting a work-piece adjacent the work tool, resilient means for normally retaining the work tool in spaced inoperative relation to the work-piece, power means for automatically moving the work tool into operative engagement with the work-piece, a power control device associated with said power means, an adjustably mounted rocking bar for manipulating said control device, and tracking rollers adjustably mounted on said rocking bar, said tracking rollers being positioned to be manipulated in accordance with the predetermined advance movement of the work-piece.

2. An improved machine automatically operative to apply line formations of predetermined length to work-pieces including in combination, a work tool designed to apply a selected line operation, a movable work holder for supporting the work tool, a support for the work-piece adjacent the work tool, resilient means connected to said work holder operative to normally retain the work tool in spaced inoperative position with respect to the work-piece advanced on said support, a fluid pressure cylinder, a piston adapted to reciprocate in said cylinder, means associated with said cylinder whereby fluid pressure applied to the piston will exert a predetermined downward pressure on the work holder to place the work tool in operative position with respect to the work-piece, a control valve for regulating the flow of fluid to said air cylinder, and means manipulated by the advance movement of the work-piece for automatically controlling said valve, said means including a control rod connected to said valve, and a pair of pivotally mounted tracking rollers operatively connected to said control rod, said tracking rollers being manipulated by the advance movement of the work-piece.

3. An improved machine automatically operative to apply line formations of predetermined length of work-pieces including in combination, a work tool, means for movably supporting said work tool, a support on which the work-piece may be advanced adjacent said work tool, power means operative to move the work tool into operative engagement with the work-piece advanced on said support, and means for automatically controlling said power means in accordance with the advance movement of the work-piece, said means including a pivoted lever operative to throw said power means into and out of operation, a rocking bar pivotally mounted on said lever, and a pair of tracking wheels adjustably mounted on said rocking bar operative to manipulate said rocking bar and pivot lever in accordance with the advance movement of the work-piece.

4. An improved machine automatically operative to apply line formations of predetermined length to work pieces including in combination, a work tool, means for movably supporting said work tool, a continuous conveyor for advancing work-pieces adjacent said work tool, resilient means for normally retaining the work tool in spaced inoperative relation to the work-piece, power means operative to move the work tool into operative engagement with the work-piece while advanced on said conveyor, and means for automatically controlling said power means in accordance with the advance movement of the work-piece, said means including a pivoted lever operative to throw said power means into and out of operation, a rocking bar pivotally mounted on said lever, a pair of tracking wheels adjustably mounted on said rocking bar, and track sections of predetermined length associated with said conveyor along which said tracking rollers may roll to manipulate said rocking bar and pivot lever.

5. An improved machine automatically operative to apply line formations of predetermined length to work-pieces including in combination, a work shaft, power means for rotating said work shaft, a work tool, means for adjustably securing said work tool to said work shaft, means for movably supporting said work shaft and associated work tool, a continuous conveyor for advancing work-pieces adjacent said work tool, resilient means for normally retaining the work tool in spaced relation to the work-piece, power means operative to move the work tool into operative engagement with the work-piece while advanced on said conveyor, and means for automatically controlling said power means in accordance with the advance movement of the work-piece, said means including a control rod for throwing said power means into and out of operation, a pivoted lever having the movable end thereof in engagement with said control rod, a rocking bar pivotally mounted on said lever, a pair of tracking wheels adjustably mounted on said rocking bar, and track sections of predetermined length associated with said conveyor along which said tracking rollers may roll to manipulate said rocking bar, pivot lever and control rod.

6. An automatic line forming machine including in combination, a work tool adapted to apply a selected line formation to the work-piece, a movably mounted holder for the work tool, control mechanism for automatically moving the work holder to manipulate the work tool into and out of operating engagement with the work-piece during advance of the work-piece adjacent the work tool, said control mechanism including resilient means for moving the tool holder in one direction, power means for moving the tool holder in the opposite direction, a power control device associated with said power means, tracking means operatively connected to said control device positioned to be manipulated in accordance with the advance movement of the work-piece to thereby manipulate said control device, and adjustable means associated with said tracking means for regulating the length of the line formation applied to the work-piece.

7. An automatic line forming machine including in combination, a work tool, a movably mounted holder for the work tool, a support for the work-piece along which the work-piece may be advanced adjacent the work tool, control mechanism for automatically moving the tool holder to manipulate the work tool into and out of operative engagement with the work-piece in predetermined relation to the advance movement of the work-piece, said control mechanism including resilient means for normally moving the tool holder into inoperative position, power means for moving the tool holder into operative position, a power control device associated with said power means, tracking means operatively connected to said control device positioned to be manipulated by the advance movement of the work-piece to thereby manipulate said control device, and adjustable means associated with said tracking means for automatically regulating the length of the line formation applied to the work-piece.

8. An automatic line forming machine including in combination, a rotary work tool adapted to apply the selected line formation to the work piece, a movably mounted holder for the work tool, means for rotating the work tool, a support for the work-piece along which the work-piece may be advanced adjacent said rotary tool, control mechanism for automatically moving the tool holder to manipulate the rotating work tool into and out of operating engagement with the work-piece during advance of the work-piece on said support, said control mechanism including resilient means for normally moving the tool holder into inoperative position, power means for moving the tool holder into operative position, a power control device associated with said power means, adjustably mounted tracking rollers operatively connected to said control device, said tracking rollers being positioned to be manipulated in accordance with the advance movement of the work-piece, and adjustable means associated with said tracking rollers for regulating the length and spacing of the line formation applied to the work-piece.

9. An automatic line forming machine including in combination, a rotary work tool, a movably mounted holder for the work tool, means for continuously rotating the work tool, mechanism for advancing the work-piece along a predetermined path adjacent the rotating work tool, control mechanism for automatically moving the tool holder to manipulate the rotating work tool into and out of operative engagement with the work-piece in predetermined relation to the advance movement of the work-piece, said control mechanism including resilient means for normally moving the tool holder into inoperative position, power means for moving the tool holder into operative position, a power control device associated with said power means, pivotally mounted tracking rollers operatively connected to said control device, said tracking rollers being positioned to be manipulated in accordance with the advance movement of the work-piece to thereby manipulate said control device, and adjustable means associated with said tracking rollers for automatically regulating the length of the line formation applied to the work-piece.

10. An automatic machine for cutting grooves of predetermined length in work-pieces including in combination, a grooving tool, means for supporting a work-piece adjacent the grooving tool, means for guiding the advance movement of the work-piece on said support, resilient means for normally retaining the grooving tool in spaced inoperative relation to the work-piece, power means for automatically moving the grooving tool into groove-cutting engagement with the work-piece, a power control device associated with said power means, a pivotally mounted rocking bar for manipulating said control device, resilient means for maintaining said rocking bar in inoperative position, and spaced tracking rollers adjustably mounted on said rocking bar, said tracking rollers being positioned to be manipulated in accordance with the predetermined advance movement of the work-piece to thereby manipulate said rocking bar and control device.

11. An automatic machine for cutting grooves of predetermined length in work-pieces, including in combination, a rotatably mounted grooving wheel, means for substantially continually rotating said grooving wheel, means for supporting a work-piece adjacent the grooving wheel, means for guiding the advance movement of the work-piece on said support, resilient means for normally retaining the rotating grooving wheel in spaced inoperative relation to the work-piece, power means for automatically moving the rotating grooving wheel into groove cutting engagement with the work-piece, a power control device associated with said power means, a pivotally mounted member for manipulating said control device, resilient means for normally retaining said member in inoperative position, and spaced tracking elements adjustably mounted on said manipulating member, said tracking elements being positioned to be manipulated in accordance with the predetermined advance movement of the work-piece to thereby manipulate said pivotally mounted member and said control device.

12. An automatic machine for cutting grooves of predetermined length in work-pieces, including in combination, a grooving tool, a work holder for supporting the grooving tool, a support for the work-piece adjacent the grooving tool, resilient means for normally retaining the grooving tool in inoperative position with respect to the work-piece on said support, pressure means for moving the grooving tool into groove cutting engagement with the work-piece, and control means adapted to be manipulated in accordance with the advance movement of the work-piece to automatically regulate and control said pressure means, said control means including a pressure control device associated with said pressure means, a pivotally mounted member for manipulating said control device, resilient means for normally maintaining said member in inoperative position, and spaced tracking elements adjustable mounted on said pivotally mounted member, said tracking elements being positioned to be manipulated in accordance with the predetermined advance movement of the work-piece to thereby manipulate said member and said control device.

13. An improved machine automatically operative to cut V-shaped grooves of predetermined length in work-pieces, including in combination, a grooving tool designed to cut V-shaped grooves of selected cross-sectional contour, a work holder for supporting the grooving tool, a support for the work-piece adjacent the grooving tool, resilient means connected to said work holder operative to normally retain the grooving tool in spaced inoperative position with respect to the work-piece advanced on said support, a fluid pressure cylinder, a piston adapted to reciprocate in said cylinder, means associated with said cylinder whereby fluid pressure applied to the piston will exert a predetermined downward pressure on the work holder to place the grooving tool into groove cutting position with respect to the work-piece, a control valve for regulating the flow of fluid to said air cylinder, and means for automatically controlling said valve, said last named means including a pivotally mounted member operatively connected to said control valve, and spaced tracking rollers adjustably mounted on said member positioned to be manipulated in accordance with the advance movement of the work-piece to thereby manipulate said member and said control device.

14. An improved machine automatically operative to cut V-shaped grooves of predetermined length in fibrous work-pieces including in combination, a grooving tool designed to cut V-shaped grooves of selected contour, a work holder for supporting the grooving tool, a work-piece supporting conveyor adjacent the grooving tool, resilient means for normally retaining the grooving tool in spaced inoperative position with respect to the work-piece resting on said conveyor, power means operative to force the grooving tool into cutting engagement with the work-piece, control means to automatically control the operation of said power means, pressure rollers for reducing vibration of the work-piece when operated upon by the grooving tool, said control means including a power control device associated with said power means, adjustably mounted tracking rollers operatively connected to said control device and to be manipulated in accordance with the advance movement of the work-piece, and resilient means normally maintaining said tracking rollers in inoperative position.

15. An improved machine automatically operative to cut V-shaped grooves of predetermined length in fibrous work-piece including in combination, a grooving tool designed to cut V-shaped grooves of selected contour, a work holder for supporting the grooving tool, a work-piece supporting conveyor adjacent the grooving tool, resilient means for normally retaining the grooving tool in spaced inoperative position with respect to the work-piece resting on said conveyor, power means operative to force the grooving tool into cutting engagement with the work-piece, control means operative to automatically control the operation of said power means, pressure rollers for reducing vibration of the work-piece when operated upon by the grooving tool, said control means including a power control device associated with said power means, a pair of spaced pivotally mounted tracking rollers adjustably connected to said control device, said tracking rollers being positioned to be manipulated in accordance with the advance movement of the work-piece, and resilient means normally maintaining said tracking rollers in inoperative position.

16. An automatic machine for cutting V-shaped grooves of predetermined length in fibrous work-pieces including in combination, a grooving tool adapted to cut V-shaped grooves of selected contour, a movably mounted holder for the grooving tool, and control mechanism for automatically moving the holder to manipulate the grooving tool into and out of cutting engagement with the work-piece during advance of the work-piece adjacent the work tool, said control mechanism including resilient means for moving the tool holder in one direction, power means for moving the tool holder in the opposite direction, a power control device associated with said power means, and adjustably mounted tracking rollers operatively connected to said control devices, said tracking rollers being positioned to be manipulated in accordance with the advance movement of the work-piece to thereby manipulate said control device.

17. An automatic machine for cutting V-shaped grooves of predetermined length in fibrous work-pieces, including in combination, a grooving tool, a movably mounted holder for the grooving tool, means for advancing the work-piece along a predetermined path adjacent the grooving tool, and means for automatically moving the tool holder to manipulate the grooving tool into and out of cutting engagement with the work-piece in predetermined relation to the advance movement of the work-piece, said means including a resilient spring element for normally moving the tool holder in one direction, power means for moving the tool holder in the opposite direction, a power control device associated with said power means, and spaced tracking means adjustably connected to said control device positioned to be manipulated in accordance with the advance movement of the work-piece to thereby manipulate said control device.

GLENN H. NORQUIST.

REFERENCES CITED

The following references are of record in the file of this patent:

UNITED STATES PATENTS

| Number | Name | Date |
| --- | --- | --- |
| 469,977 | Perrins | Mar. 1, 1892 |
| 857,738 | Karstens | June 25, 1907 |
| 1,372,979 | Norris | Mar. 29, 1921 |
| 1,744,651 | Lessor | Jan. 21, 1930 |
| 1,897,049 | Hawes | Feb. 14, 1933 |
| 1,995,382 | Fenton | Mar. 26, 1935 |
| 2,214,450 | Boehle | Sept. 10, 1940 |
| 2,340,121 | Hamilton | Jan. 25, 1944 |
| 2,374,846 | Thresh | May 1, 1945 |